United States Patent

[11] 3,617,630

[72] Inventor Leonard Reiffel
Chicago, Ill.

[21] Appl. No. 777,947
[22] Filed Oct. 7, 1968
[45] Patented Nov. 2, 1971
[73] Assignee Telestrator Industries, Inc.
Chicago, Ill.
Continuation-in-part of application Ser. No. 720,130, Apr. 10, 1968, now abandoned.

[54] SUPERIMPOSED DYNAMIC TELEVISION DISPLAY SYSTEM
13 Claims, 4 Drawing Figs.

[52] U.S. Cl. .......... 178/6.8, 178/DIG. 6, 178/18, 178/19
[51] Int. Cl. .......... H04n 7/18
[50] Field of Search .......... 178/6 F, 6 M, 5.6, 5.8, 18, 19, 6.8; 35/9; 340/324.1

[56] References Cited

UNITED STATES PATENTS

| | | | |
|---|---|---|---|
| 2,168,047 | 8/1939 | Skellett | 178/19 |
| 2,227,083 | 12/1940 | Handrick | 178/18 |
| 2,241,544 | 5/1941 | Dreyer, Jr. | 178/6.8 X |
| 2,338,949 | 1/1944 | Kupfmuller et al. | 178/19 |
| 2,487,641 | 11/1949 | Denk | 178/6.8 |
| 2,986,596 | 5/1961 | Hammond, Jr. | 178/5.6 |
| 3,106,707 | 10/1963 | Thompson | 343/7.3 |
| 3,399,401 | 8/1968 | Ellis et al. | 340/324 |
| 3,423,528 | 1/1969 | Bradhsaw et al. | 178/19 |

OTHER REFERENCES

IBM Technical Disclosure Bulletin, Vol. 1, No. 6 April 1959, Pages 13–14, " Generation of X and Y Coordinate Information"

*Primary Examiner*—Robert L. Griffin
*Assistant Examiner*—Richard K. Eckert, Jr.
*Attorney*—Mullin and Siegel

ABSTRACT: A visual display system for superimposing linear visual images upon a dynamic television image. System covers the use of at least two television cameras or one camera and a source of electronic background video images such as a video tape recorder, or one scene camera used in conjunction with a double-ended scan converter. One camera or the converter picks up the image from a storage device which in turn is actuated by a signal generator, said image being superimposed on the background video image.

INVENTOR.
LEONARD REIFFEL
BY Mullin & Siegel
ATTYS.

INVENTOR.
LEONARD REIFFEL
BY Mullin & Siegel
ATTYS

SUPERIMPOSED DYNAMIC TELEVISION DISPLAY SYSTEM

REFERENCE TO OTHER APPLICATION

This application is a continuation in part of my copending application Ser. No. 720,130 filed Apr. 10, 1968 now abandoned.

BACKGROUND OF THE INVENTION L

This invention relates to a visual display system and Lmore particularly relates to such a system in which linear visual images are superimposed upon a normal, moving television image or scene.

In television broadcasting, it is sometimes desirable to add to the image to point out a certain feature thereof or to emphasize a particular aspect of the scene. The announcer, speaker or instructor finds considerable utility in being able to add to a television image in much the same manner, for example, as chalk is used to illustrate, emphasize or point out something previously written on a blackboard. By the practice of my invention, one may readily and conveniently do the same with a television image and to the best of my knowledge nothing comparable to my system is shown in the prior art.

Accordingly, a primary purpose of my invention is to provide a novel visual display system wherein figures, diagrams or drawings formed of linear elements may be readily, conveniently and quickly superimposed upon a normal television image at the transmission end of the system.

Another object of my invention is to provide a novel video display system employing noncaptive video cameras that can be employed for other, traditional purposes when not in use for operating with my system.

A further object of my invention is to provide such a novel video display system wherein at least one television camera is employed to photograph a scene and a double-ended scan converter or the like is used to electrostatically store, scan and transmit an image being superimposed upon the basic scene.

Still another object of my invention is to provide a visual display system for use with a video screen wherein the operator of such system concurrently observes the total image being transmitted and the image such operator is superimposing thereon.

Still a further object of my invention is to provide a visual display system for use with a video screen wherein prerecorded diagrams, data or drawings may be superimposed upon the scene image being transmitted.

These and other objects, features and advantages of my invention will become apparent to those skilled in this particular art from the following detailed disclosure thereof and the accompanying drawings in which.

The present system will next be described in conjunction with such drawings.

Figures 1, 2:
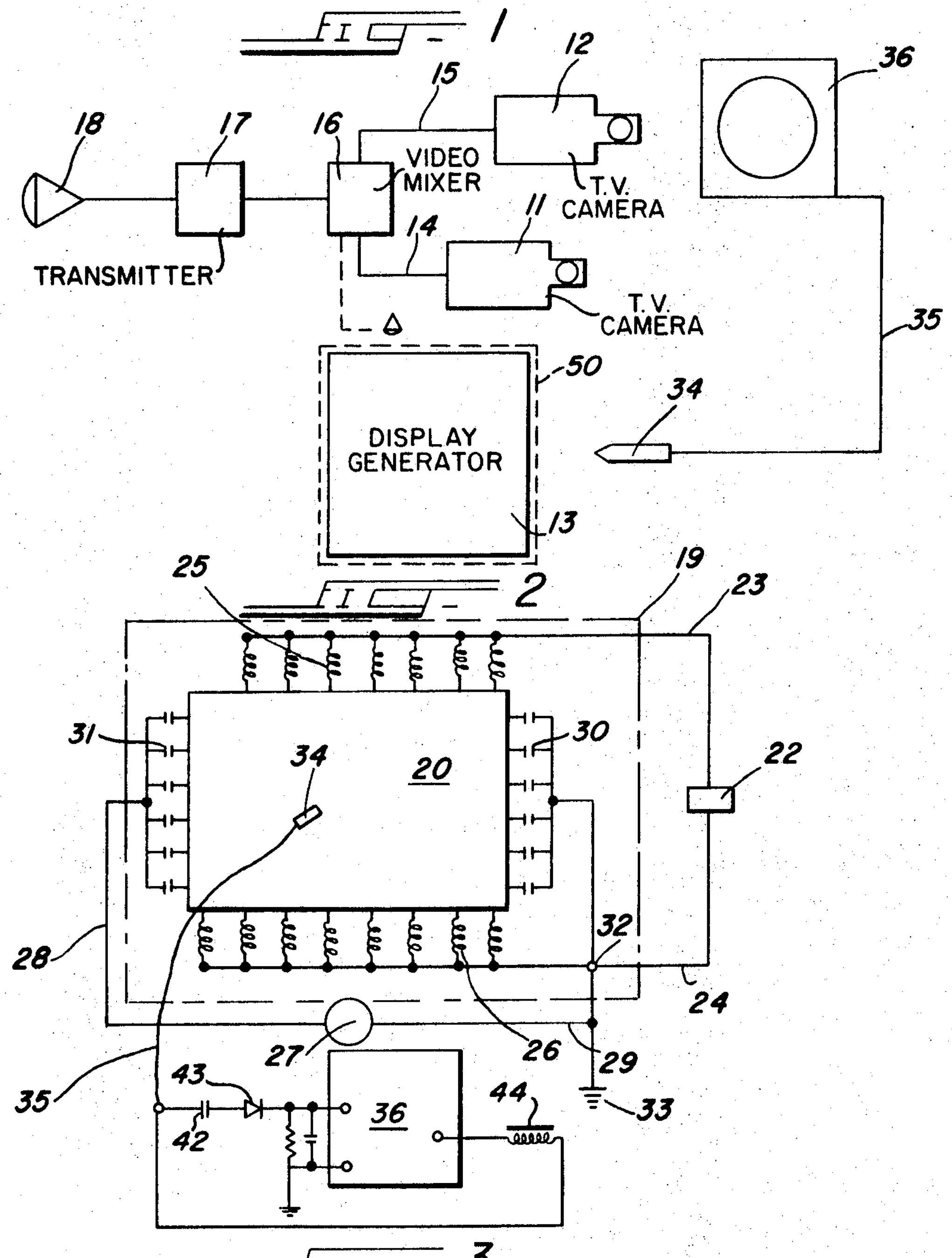
FIG. 1 is a block diagram of one embodiment of my visual display system.
FIG. 2 is a detailed drawing of one embodiment of an electrical input device for use herewith.
Figure 3:
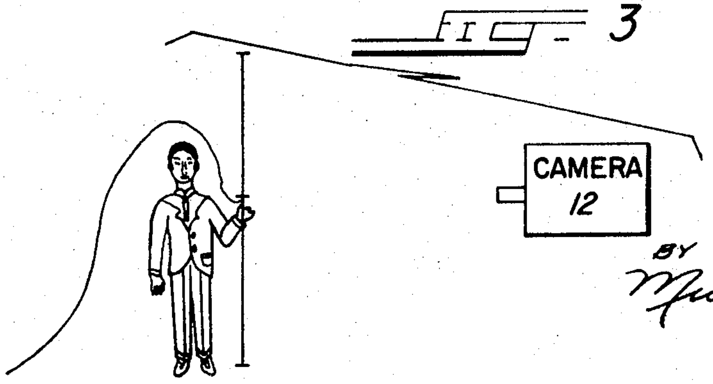
FIG. 3 illustrates another use of the present system.

In the embodiment hereof illustrated in FIGS. 1, 2 and 3, I provide two standard television cameras, denoted by the numerals 11 and 12. For purposes of discussion, camera 11 provides the scene input and camera 12 photographs the output of the manual display generator 13. The electrical signal from camera 11 passes through lead 14 and such signal from camera 12 passes through lead 15 to converge in a standardly available video signal mixer 16. The mixed signal output from the latter is then fed into the transmitter 17, transmitted therefrom in the standard manner and then picked up by a signal receiver 18, such as a home television receiver, and a mixed image is visually displayed thereon. Scenes conveyed by camera 11 can obviously be replaced by images from a video tape recorder or "instant replay" systems currently available or from a motion picture projector or the like.

I also note that the signal coming from the mixer 16, instead of being directly transmitted, may be fed into a video tape recorder and stored for subsequent transmission. Furthermore, as will be subsequently described, prerecorded audio magnetic tapes may also be employed herewith to replace the manual display generator 13.

All of the foregoing components of the system are standardly available commercial items.

I also provide a manual display generator 13 of either a digital or analogue type, which provides information on the X- and Y-coordinates of a probe or pointerlike member at the control of the display operator. In the preferred embodiment hereof, such generator is in the form of a light-transparent or semitransparent, electrically conducting thin plate. However, such plate, as considered below may be opaque to visible light in various modifications of my basic system. Such plate has an electrically insulating frame 19 and the central portion 20 thereof, contained within such frame, is electrically conducting. Such member 20 is in the form of a continuously conducting resistive layer and may be formed of, for example, a tin-oxide-coated electrically conductive glass or in the alternative, may be a mesh screen of resistance wire or an electrolytic solution. It is important in some embodiments that such plate 20 be of a continuously conducting nature.

There are several other methods known in the art for determining and reading the X- and Y-position of the probe 34 as it contacts the plate 20. For example, a diode switching system such as is shown in the patent to Cameron, U.S. Pat. No. 3,449,516, or a stylus attached by rigid or stringlike members to a pair of potentiometers may be used herewith. Furthermore, digital position in which the probable position is identified by use of a pair of insulated, intersecting, open gridworks of wires or conducting lines can be employed. I have employed such systems as well as the alternate therefor which will be described as this description proceeds.

A DC potential is impressed in the vertical direction across member 20 from a DC generator 22 and leads 23 and 24 through the inductor members 25 and 26. At the same time an AC potential is impressed in the horizontal direction across the electrically conducting member 20 by an AC generator 27 and leads 28 and 29 through series capacitors 30 and 31 which block any effect of the AC circuit on the coacting DC circuit and vice versa; at the same time inductive members 25 and 26 block any effect of the AC circuit on the coacting DC supply circuit and vice versa. It will be understood, of course, that the DC and AC actuation of the display generator 20 could be reversed. The AC and DC lines 29 and 24 are connected at contact 32 and grounded at 33. The AC generator 27 and DC generator 22 establish potential gradients across the plate 20, and the amplitudes of the signals at any point on the plate 20 are proportional to the horizontal and vertical distances from the lower right-hand corner of such plate.

An integral part of my system is the electrically conducting probe 34 which has extending therefrom a lead 35 whereby such probe is electrically connected to an image memory and display unit 36 which shall be considered subsequently as the description proceeds.

The probe 34 picks off a mixed AC-and-DC signal from the output generator 13, which signal contains information defining the exact point of contact between the probe 34 and generator 13, i.e. such signal provides the X- and Y-coordinates of a point on the plane of the generator. That signal contains both an AC component giving the horizontal distance and a DC component giving the vertical distance. Such signal is then split into its AC and DC components the amplitudes of which are then fed into an electrostatic storage oscilloscope 36. Such oscilloscopes are commercially available. The signal from lead 35 passes through a high-pass filter capacitor 42 and then a diode member 43 into the storage oscilloscope 36. The capacitor 42 filters out the DC signal and the remaining AC signal is rectified by diode 43 to provide the horizontal input into the oscilloscope.

At the same time, the mixed signal from lead 35 passes into and through a low-pass filter coil 44 into the storage oscilloscope 36 to fix the vertical position of the beam in response to the DC level picked up by the probe 34. Such split signal is then displayed and held as a single point or a line from a succession of signals, on the storage oscilloscope face which is in turn then photographed by the television camera 12. The outputs of cameras 11 and 12 are then mixed by the video signal mixer 16 for transmission as set out above.

In the preferred embodiment hereof the manual display generator 13 consists essentially of a thin sheet of electrically conducting glass with the related circuitry such as that previously described. For the operator to observe the basic video scene and to see how he is affecting it, such glass is preferably placed upon the face plate of a standard video receiver 50 which is simultaneously displaying the images from the two cameras 11 and 12. An opaque sheet may be employed in lieu of the transparent or semitransparent one if for one reason or another, as in preparing prerecorded diagrams for later use with the system, it is unnecessary for the operator to observe the basic video screen. In this case obviously the aforesaid video receiver would not be used but it may be desirable, in various known manners, to project guidelines or other information onto the opaque sheet to assist the operator.

Another method of using an opaque sheet while preserving the ability to precisely locate hand-drawn diagrammatic information on the basic video image would involve the use of a standard 45° "beam-splitter" or semitransparent mirror arrangement. A video screen mounted behind said mirror would appear to the observer to be superimposed optically on the Lopaque horizontal working surface of the sheet.

Obviously, projection TV image techniques could be employed as well in a front projection configuration using the opaque sheet in the manner of a motion picture screen.

In another embodiment hereof, the plate used in conjunction with the probe is fabricated of two transparent flexible signal sheets or tape members and interleaved with two transparent grounding sheets. The signal sheet or tape members Lare separated by small gaps from the grounding sheets. One signal sheet provides X-coordinate signal voltages and the other signal sheet provides Y-coordinate signal voltages. When the probe is pressed against the top sheet to force contact of the intermediate sheets at the point of the probe with the grounding sheets the position of the probe may be electronically determined as described above —i.e., the X- and Y-coordinates of the probe are thus electronically established. It should be noted that the probe does not pierce the sheets but only causes a pressure contact. In some applications the sheets may be opaque and the video image displayed by projection, etc. as previously outlined.

In another embodiment hereof, as illustrated in FIG. 3, a relatively large sheet of such glass may be suspended in front of the performer and upon his movements of the probe thereover, or with the use of a small fingertip probe the viewer will get the impression that the performer is writing in thin air.

In still another embodiment hereof, the superimposed signals to the storage oscilloscope may stem from a prerecorded audio frequency magnetic tape. The output from the tape on which appropriate voltage to create the desired drawing is recorded is fed into the storage oscilloscope and then portrayed on camera 12. The horizontal and vertical positioning signals which control the oscilloscope beam are recorded as a function of time along with a suitable signal to provide beam "on-off" or Z-axis modulation. Thus, three channels of information are required to prerecord a drawing or animated sequence, etc. This is not meant to imply that a three-channel tape recorder is needed —differently modulated audio frequency carriers can be recorded on a single track of a standard tape recorder. This provides the performer with pushbutton, "call-up" control over the image being superimposed and is most practical for images such as maps, graphs or charts.

Prerecorded symbols such as arrows, circles and squares may also be applied to the basic video scene with the present system. In such applications the hand-manipulated probe merely sets the position of the starting point of the symbol to be automatically drawn. This is accomplished by directly adding the required prerecorded time-dependent X- and Y-coordinate signals for tracing out the symbol to the fixed X- and Y-coordinate signals picked up by the probe 34 as it is held stationary on the plate of the signal generator 13.

The superimposed image is retained on the face of the storage oscilloscope until erased by the performer. Furthermore, instead of solid line image superimposition it is also feasible to make a broken line image by Z-axis modulation of the oscilloscope input.

Figure 4:
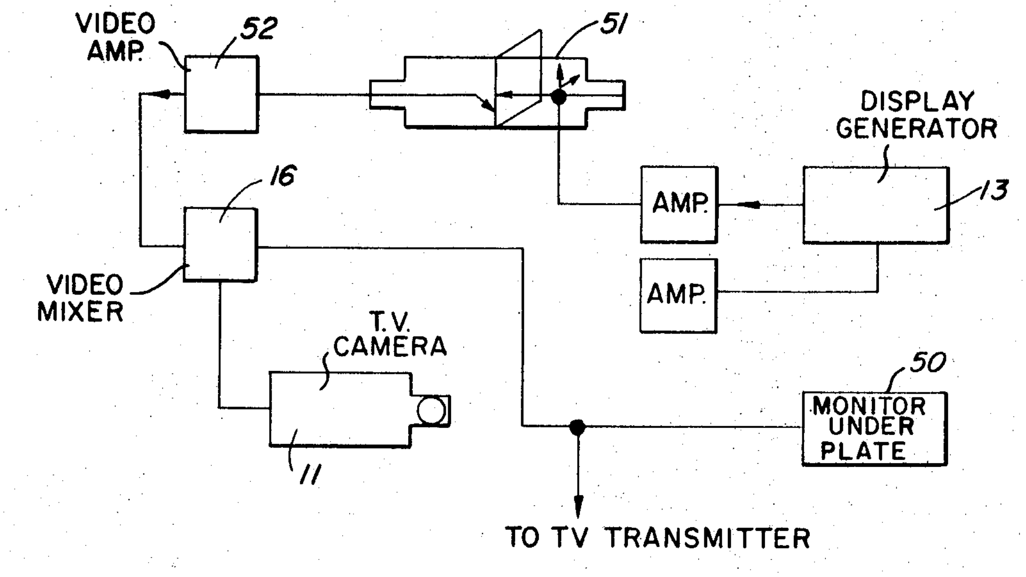
FIG. 4 is a block diagram of another embodiment of my invention wherein a double-ended scan converter is used in lieu of a video camera.

Another embodiment hereof is illustrated in FIG. 4. In this system the display camera 12 and the electrostatic storage oscilloscope 36 (of FIG. 1) are replaced by a double- ended scan converter 51, or the like. The X- and Y-signals from generator 13 and probe 34 are fed directly into said converter through amplifiers where they are used to store the desired image in the form of electrostatic charges.

The double-ended scan converter is commercially available. One example thereof is Type H-1213 manufactured by the Hughes Aircraft Company. A brochure of Hughes describing said device accompanies this application and is made part of the record hereof. It is submitted for purposes of description and it should be understood that similar devices may be likewise used herewith.

It will be understood that various modifications and variations may be affected without departing from the spirit or scope of the novel concepts of my invention.

I claim as my invention:

1. A system for superimposing visual images upon a dynamic television image comprising in combination:

a. at least one source of video signals which constitute a basic image being transmitted;
b. image reproduction means for displaying the basic image;
c. manually movable probe means operable directly upon said image reproduction means to electronically define and identify an X-Y coordinate in self-defining registration with respect to said image;
d. means for storing the X- and Y-coordinates of the position of said probe means relative to details of the image from said video signal source;
e. means for converting stored X- and Y-coordinates of said probe means to video signals representative of said coordinates; and
f. video-signal-mixing means and means connecting said mixing means with said video signal source and said converting means.

2. The system as defined in claim 1 wherein a scan converter is interconnected with said probe means and said video-signal-mixing means and is used to store, scan and transmit the image being superimposed.

3. A system for superimposing visual images upon a dynamic television image comprising in combination:

a. at least two video cameras, one of which photographs the image being superimposed and the other photographs the basic image being transmitted;
b. video-signal-mixing means and means connecting said mixing means with said video camera;
c. transmitting means for the output of said mixing means;
d. manually movable probe means for generating the image being superimposed;
e. electrical potential means for identifying the X- and Y-coordinates of the position of said probe means relative to details of images from one of said video cameras; and
f. storage display means connected to said probe for visually reproducing said X- and Y-coordinates of said probe means.

4. The system as defined in claim 3 wherein said means for identifying the X- and Y-coordinates of the position of said probe means has as one element thereof a transparent conductive plate means and wherein said plate means has electrical-potential- defining components associated therewith and connected to said storing means whereby X- and Y-coordinates may be determined.

5. The system as defined in claim 1 wherein said storage means includes as one element thereof an audio frequency recorder for recording electrical signals corresponding to the X- and Y- coordinates defined by said probe means, there being input to said recorder from said probe, and in playback mode output from said recorder feeding signals representative of a visual display of said superimposed image to point of input normally supplied by said manually operated display generator.

6. A system for superimposing visual images upon a dynamic television image comprising in combination:

a. at least one source of video signals which constitute a basic image being transmitted;
b. image reproduction means for displaying the basic image;
c. an audio frequency record source storing electrical signals representative of X- and Y-coordinates of an image to be superimposed on the basic image;
d. scan converter means connected to the output of said audio frequency record source which scan converter converts the recorded graphic signal back to video format; and
e. video-signal-mixing means interconnected with said video signal source and said scan converter for causing the simultaneous display of the basic image and said superimposed image on said reproduction means.

7. The system as defined in claim 1 and including an audio frequency playback device connected to said mixing means for superimposing at any point in time a second image on the basic image.

8. The system as defined in claim 1 and including transmitting means for the output of said mixing means.

9. The system as defined in claim 1 wherein said storage display means is of the electrostatic type.

10. The system as defined in claim 4 wherein said plate means consists essentially of two tapes positioned in adjacent parallel plane and transverse to each other and wherein both said tapes are backed by a transparent grounding plate, and wherein the X- and Y-coordinates of said probe means are determined by pressure of the probe on to said tapes and grounding plate.

11. In the system as defined in claim 4 the improvement of placing said plate means over a video receiver presenting a visual output of the total signal being transmitted.

12. A system for superimposing line drawings upon a visual image comprising in combination:

a. a first means for generating a first video signal representative of a first visual image;
b. electronic display means for producing a visual display from video signals;
c. electrical means for generating a line drawing, said means comprising manually controlled means mounted on the display resulting from said electronic display means for generating signals representative of said line drawing, and display means for said signals;
d. a video camera for viewing said generated line drawing thereby producing a second video signal;
e. means for combining said first and second video signals;
f. means connecting the output of said combining means to said electronic display means, thereby producing a display of said line drawing superimposed on said first image.

13. A system for superimposing line drawings upon a visual image comprising in combination:

a. a first means for generating a first video signal representative of a first visual image;
b. electronic display means for producing a visual display from video signals;
c. electrical means for generating a line drawing, said means comprising manually controlled means mounted on the display resulting from said electronic display means for generating signals representative of said line drawing;
d. a scan converter for recording and reproducing said representative signals;
e. means for combining said first video signal and sand reproduced signals;
f. means connecting the output of said combining means to said electronic display means, thereby producing a display of said line drawing superimposed on said first image.

* * * * *